April 27, 1965 M. J. DE GOOD ETAL 3,180,996

PHOTOSENSITIVE DIGITAL DIRECTOR DEVICE

Filed Dec. 26, 1962

2 Sheets-Sheet 1

INVENTORS
MAYNARD J. DE GOOD
CLYDE L. BOWMAN
BY CLAYTON H. VANDERMEER

Price & Heneveld
ATTORNEYS

INVENTORS
MAYNARD J. DE GOOD
CLYDE L. BOWMAN
BY CLAYTON H. VANDERMEER
Price & Heneveld
ATTORNEYS United States Patent Office
3,180,996
Patented Apr. 27, 1965

3,180,996
PHOTOSENSITIVE DIGITAL DIRECTOR DEVICE
Maynard J. De Good, Clyde L. Bowman, and Clayton H. Vander Meer, Grand Rapids, Mich., assignors to The Rapids-Standard Company, Inc., Grand Rapids, Mich., a corporation of Michigan
Filed Dec. 26, 1962, Ser. No. 247,409
3 Claims. (Cl. 250—223)

This invention concerns code setting devices, and more particularly devices for setting the position of reflectors on objects being conveyed over a multi-path conveyor in such a manner that diverter actuators along the conveyor are operated whenever an object passes by them which carries a reflector in a position where it can reflect light from a light source in the sensor onto a photocell in the sensor.

With the increasing use of automatic routing devices on complex conveyor systems, there has been an increasing need for a simple, inexpensive routing code setting means that can readily be attached to the trays or other objects circulating on the conveyor, have low tolerance requirements, and can be quickly and accurately set for any desired routing even by inexperienced operators. At the same time, it was necessary that such a change in routing be accomplished without the necessity of inserting or removing small separate parts which can easily become lost or misplaced.

The present invention fills this need by providing a small, inexpensive plate which can be readily attached to the trays or other articles and which is provided with one or more arms whose one end is attached to a pivot mounted in the plate, and whose other end carries a disc of reflective material. By moving the arm about its pivot, the reflective material can be brought to different levels with respect to the tray, so that only sensors having their photocell and light source at the proper level will respond to the reflection as the tray passes by.

It is consequently the primary object of the invention to provide a simple, inexpensive, quickly settable routing code setter for conveyed objects which is not subject to close tolerances.

It is another object of this invention to provide a digital director for conveyed objects in which the relative position with respect to each other and with respect to a reference point of a plurality of reflectors each settable to a finite number of settings is indicative of a separate digital routing code which can be unequivocally sensed by photoelectric sensing means.

These and other objects of the invention will become apparent from a perusal of the following specification, taken in connection with the accompanying drawings in which.

Basically, the invention is concerned with the rapid setting of the height of a reflector with respect to the bottom of the tray, which in turn rests on the conveyor surface as the tray is being conveyed. Because of the comparatively large size of the reflector and the relatively wide beam angle with which a device of this type can operate, very low tolerances are required in the manufacture and use of the device. Particularly, the lateral position of the tray on the conveyor is practically immaterial, and even the height variation that might result from a small amount of vibration does not affect the operability of the device.

By combining two or more arms, and making the sensor responsive only to simultaneous illumination of all its photosensitive elements, the sensor can be made responsive to both the height of the individual reflectors and their mutual horizontal spacing. This, of course, vastly increases the number of code combinations obtainable by the use of the device.

Figure 1:
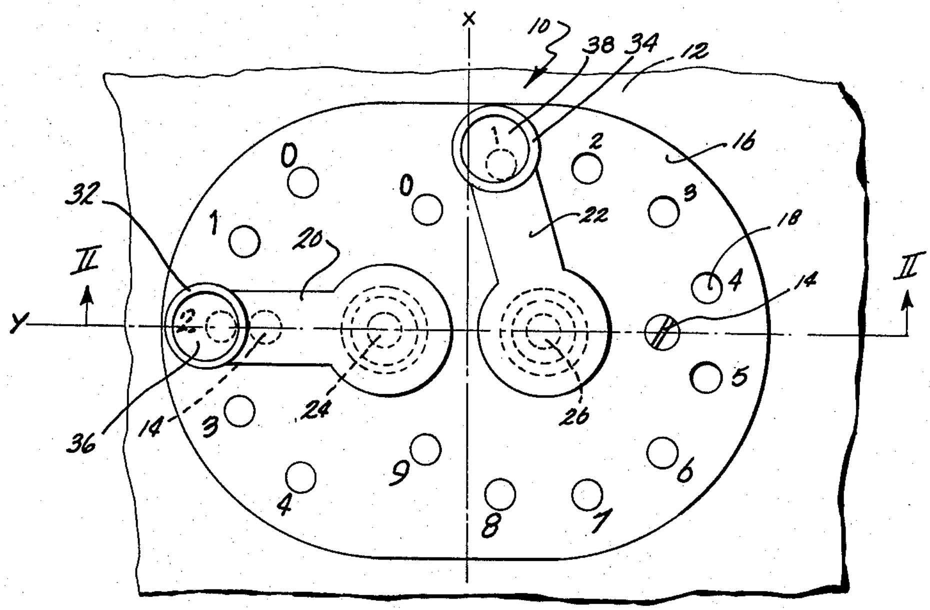
FIG. 1 is a side elevation of the code setting device of this invention.

Referring now to the drawings, FIG. 1 shows the digital director or code setting device 10 affixed to one of the side walls of a tray 12 by any appropriate means such as screws 14. The device 10 has a mounting plate 16 on which are formed a plurality of shallow depressions 18. A pair of arms 20, 22 are journaled on shafts 24, 26 which pass through apertures in the mounting plate 16 and are equipped with Tinnerman washers 28, 30 or similar fastening means to hold the arms on the plate 16.

Figure 2:
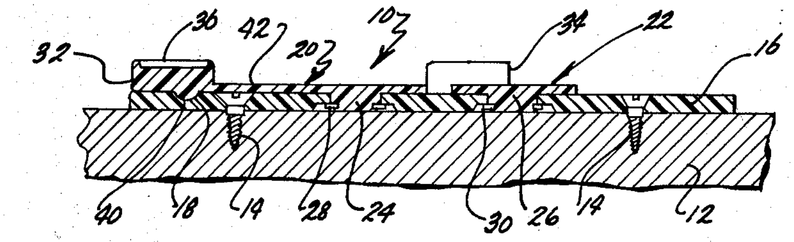
FIG. 2 is a horizontal section along line II—II of FIG. 1.

The outer extremities of the arms 20, 22 are provided with knobs 32, 34 which have a shallow depression 36, 38 in which reflective material is placed. The underside of knobs 32, 34 is provided with protrusions such as 40 (FIG. 2) which tend to drop into the shallow depressions 18 under the bias of the resiliency of the central portion 42 of the arms 20, 22.

Figure 3:
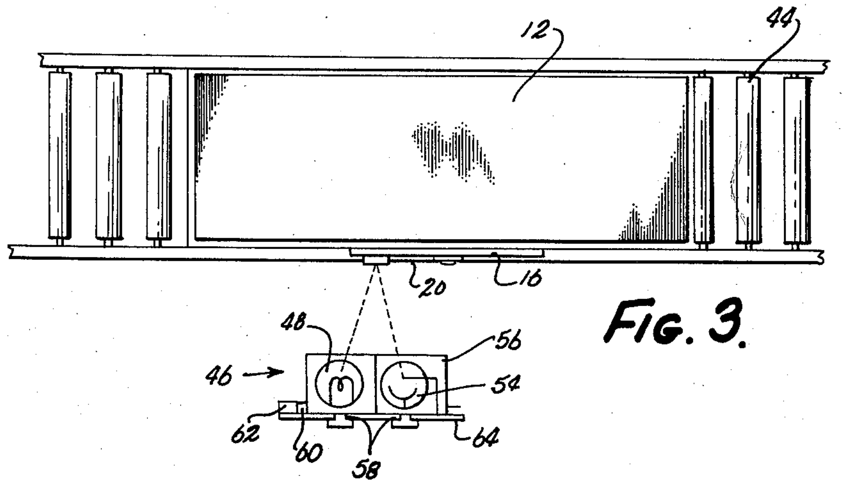
FIG. 3 is a schematic diagram showing the operation of the device as a tray is being conveyed past a sensor.
Figure 4:
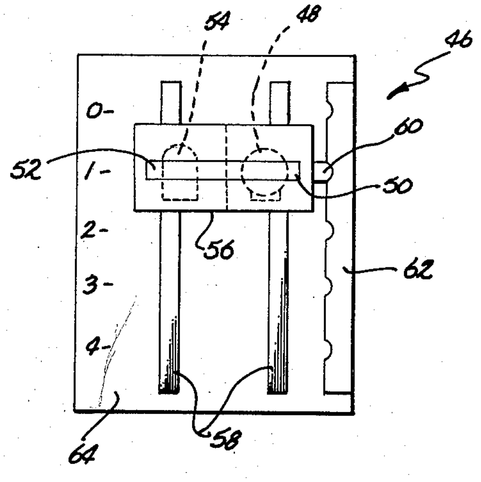
FIG. 4 is a schematic elevation of an adjustable sensor for one-arm operation.

Turning now to FIG. 3, it will be seen that as the tray 12 travels along a conveyor 44 past a sensor 46, light emitted by the light source 48 travels through slot 50 (FIG. 4), strikes the reflective material in the depression 36 of arm 20, and is reflected through slot 52 onto the photocell 54. In FIGS. 3 and 4, the chassis 56 which carries the light source 48 and photocell 54 has been symbolically depicted as vertically movable in tracks 58 so that it can be adjusted to any one of five levels 0 through 4 corresponding to the positions 0 through 4 of arm 20. In the schematic view of FIG. 4, a detent 60 is indicated on chassis 56 for cooperation with a notched bar 62 attached to the frame 64 of the sensor 46 so as to hold the chassis 56 in any of the chosen positions. It will be understood, of course, that the chassis 56 may be fixed, or that it may be made adjustable by other means than those shown.

If both the arms 20 and 22 are to be used, the frame 64 of the sensor 46 may be provided with a set of arms 66, 68 corresponding in size and pivot location to the arms 22 and 20, respectively. These arms could, for example, carry chassis 70, 72 each containing a light source and a photocell. In such a case, the chassis 70, 72 would preferably be pivotally mounted on the arms 66, 68 so that their slots 74, 76 could be made horizontal in any position of the arms 66, 68. In such a device, the X, Y coordinates of the chassis 70, 72 could be made to exactly equal the X, Y coordinates of the reflectors 36, 38 in any position of the arms 20, 22.

*Operation*

The operation of the device of this invention is simple. For example, if it be desired that the tray 10 be selectively ejectable at any of the five take-offs, the chassis 56 of the sensor 46 operating the first take-off might be set at 0, the chassis 56 at the second take-off at 1, the third take-off at 2, and so forth. Then, if it is desired to eject the tray at the third take-off, arm 20 is set at 2 as shown in FIG. 1. (In this five station device, arm 22 would be omitted.) As the tray 12 passes by the various sensors 46, the first sensor would not respond because the reflector 36 is too low to transfer light from the light source to the photocell. For a like reason, the second sensor would not respond either. When the tray reaches the third sensor, however, the reflector 36 is in alignment with the slots 50, 52, and light is reflected from the light source 48 to the photocell 54. This reflection momentarily illuminates the photocell 54 and causes it to emit an electrical signal which can be used in any known manner to operate the take-off mechanism.

Figure 5:
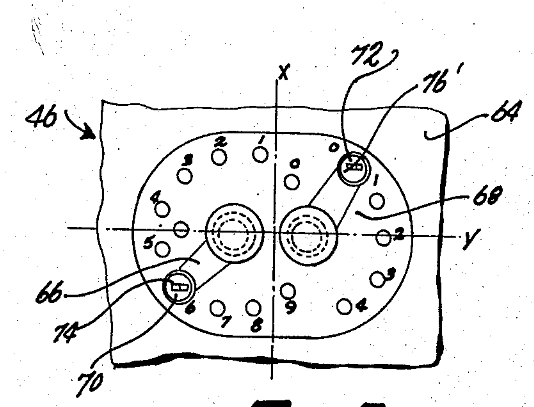
FIG. 5 is a schematic diagram of an adjustable sensor for two-arm operation.

It will be noted that the single arm operation just described can be achieved only with arm 20 in the embodiment shown in FIG. 1. If arm 22 were used, the device could not distinguish between setting 0 and 3, or between setting 1 and 2, or 6 and 9, or 7 and 8, as each of these pairs of settings are at the same level in FIG. 1. If, however, both arms are used in connection with a sensor 46 such as that shown in FIG. 5, it will be readily apparent that, in the position of the arms as shown in FIG. 5, simultaneous illumination of both photocells will occur only if arm 20 is in position 0 and arm 22 is in position 6, but not when arm 22 is in position 9, even though that position is at the same level as position 6. If the outputs of the two photocells are connected in series, it will be seen that an impulse capable of actuating the take-off can occur only if both photocells are illuminated at the same time. Thus, in the example shown herein, utilization of arm 20 only provides five different settings, whereas utilization of arms 20 and 22 together provides fifty different settings. Obviously, the number of possible combinations can be enlarged by adding more arms or increasing the arc of rotation of arm 20 when at least two arms are used.

It will be readily seen that the present invention is capable of being carried out in many different ways depending on the circumstances and requirements of any particular installation. Consequently, we do not desire to be limited to the embodiment shown, but only by the scope of the following claims.

We claim:

1. In combination with an article conveyor, a binary code, article detecting and sensing system comprising: a first mounting support for fixed attachment to an article on the conveyor; a plurality of independently movable code setting arms, each having a pivotal mounting to said first support; separate light reflector means on each respective arm, radially spaced from the pivotal mounting of said respective arm, to be movable simultaneously in two dimensions with pivoting of the arm; indicia marked locator means circumferentially arranged on said first support, about each of said arms, and cooperative with means on the respective arms to hold the arms in a specific, selected, located coded pivotal position for fixing said reflector means in a particular code combination in said two dimensions; at least one code detector and sensor means having a second support for fixed attachment along said conveyor; a second plurality of arms each having a pivotal mounting on said second support, and corresponding to said code setting arms; each of said second arms including a set of light source means and light detecting means, both spaced radially from the pivotal mounting of the respective arm an amount generally equal to that of the corresponding reflector means on their respective arms, to be cooperative therewith when aligned therewith in said two dimensions; and indicia marked locator means on said second support arranged circumferentially about each of said arms, corresponding in identity and location with those of said first support, and cooperative with means on said second plurality of arms to hold each of said second plurality of arms in preset detecting positions in said two dimensions, whereby with presetting pivoting of said first plurality and said second plurality of arms, a coded article can be detected by the corresponding detector and sensor.

2. In combination with an article conveyor, an article detecting and sensing code system comprising: a first mounting support for fixed attachment to an article on the conveyor; at least one independently movable code setting arm having a pivotal mounting to said first support; light reflector means on said arm, radially spaced from its pivotal mounting, to be movable simultaneously in two dimensions with pivoting of the arm; indicia marked locator means circumferentially arranged on said first support, about said arm, and cooperative with means on the arm to hold the arm in a specific, selected, located, coded pivotal position for fixing said reflector means in said two dimensions; at least one code detector and sensor means having a second support for fixed attachment along said conveyor; a second arm having a pivotal mounting on said second support, and corresponding to said code setting arm; said second arm including light source means and light detecting means, both spaced radially from the pivotal mounting of the arm an amount generally equal to that of the corresponding reflector means on the code setting arm, to be cooperative therewith when aligned therewith in said two dimensions; and indicia marked locator means on said second support arranged circumferentially about said arm, corresponding in identity and location with those of said first support, and cooperative with means on said second arm to hold said second arm in a preset detecting position in said two dimensions, whereby with presetting pivoting of said first and second arms, a coded article can be detected by the corresponding detector and sensor.

3. The combination in claim 1 wherein said light source means and light detecting means are mounted side by side on a mount having a pivotal connection to their respective arms.

References Cited by the Examiner

UNITED STATES PATENTS

| | | | |
|---|---|---|---|
| 1,768,394 | 6/30 | Bracke | 200—11 |
| 1,781,424 | 11/30 | Anderson | 198—38 |
| 1,895,925 | 1/33 | Hammond | 250—236 X |
| 1,937,303 | 11/33 | Worrall | 198—38 X |
| 2,043,293 | 6/36 | Jennings | 198—38 X |
| 2,216,576 | 10/40 | Sinsabaugh | 88—78 |
| 2,508,086 | 5/50 | Alvarez | 198—38 |
| 3,122,237 | 2/64 | Stenstrom | 88—1 X |

RALPH G. NILSON, *Primary Examiner.*

WALTER STOLWEIN, *Examiner.*